(12) United States Patent
Ichinose et al.

(10) Patent No.: US 12,527,528 B2
(45) Date of Patent: Jan. 20, 2026

(54) IMAGE DISPLAY APPARATUS, METHOD, AND PROGRAM

(71) Applicant: FUJIFILM Corporation, Tokyo (JP)

(72) Inventors: Akimichi Ichinose, Tokyo (JP); Keigo Nakamura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 394 days.

(21) Appl. No.: 18/176,489

(22) Filed: Mar. 1, 2023

(65) Prior Publication Data

US 2023/0225681 A1 Jul. 20, 2023

Related U.S. Application Data

(63) Continuation of application No. PCT/JP2021/023423, filed on Jun. 21, 2021.

(30) Foreign Application Priority Data

Sep. 28, 2020 (JP) ................................ 2020-162676

(51) Int. Cl.
*A61B 6/03* (2006.01)
*A61B 6/46* (2024.01)
*G06T 7/00* (2017.01)

(52) U.S. Cl.
CPC ................ *A61B 6/03* (2013.01); *A61B 6/463* (2013.01); *G06T 7/0012* (2013.01)

(58) Field of Classification Search
CPC .................................................... G06T 7/0012
See application file for complete search history.

(56) References Cited

U.S. PATENT DOCUMENTS

| 10,646,206 B1 * | 5/2020 | Kreuzer ................. A61B 8/465 |
| 2006/0177133 A1 | 8/2006 | Kee |
| 2007/0057962 A1 | 3/2007 | Matsumoto |
| 2010/0141675 A1 | 6/2010 | Matsumoto |
| 2013/0301953 A1 * | 11/2013 | Montague ........... G06F 3/04845 345/660 |
| 2017/0290569 A1 * | 10/2017 | Utsunomiya .......... A61B 8/464 |

(Continued)

FOREIGN PATENT DOCUMENTS

| CN | 113012134 A * | 6/2021 |
| JP | 2007079960 | 3/2007 |

(Continued)

OTHER PUBLICATIONS

"International Search Report (Form PCT/ISA/210) of PCT/JP2021/023423", mailed on Aug. 10, 2021, with English translation thereof, pp. 1-5.

(Continued)

*Primary Examiner* — Di Xiao
(74) *Attorney, Agent, or Firm* — JCIPRNET

(57) ABSTRACT

A processor superimposes and displays relevant information related to a medical image on the medical image so as to be switchable between display and hiding. The processor switches at least a part of the relevant information to be hidden in a case where another operation related to display or interpretation of the medical image is detected, the other operation being an operation other than a dedicated operation for switching between display and hiding of the relevant information while the relevant information is being displayed.

9 Claims, 9 Drawing Sheets

(56) References Cited

U.S. PATENT DOCUMENTS

| | | | |
|---|---|---|---|
| 2018/0177446 A1 | 6/2018 | Okabe et al. | |
| 2019/0182454 A1* | 6/2019 | Berger | G16H 30/40 |
| 2020/0402646 A1* | 12/2020 | Nickisch | G06F 18/2178 |
| 2021/0049731 A1* | 2/2021 | Fukuda | G06T 1/0007 |

FOREIGN PATENT DOCUMENTS

| | | | |
|---|---|---|---|
| JP | 2008521462 | 6/2008 | |
| JP | 2011254904 | 12/2011 | |
| JP | 2015073643 | 4/2015 | |
| WO | 2017033516 | 3/2017 | |
| WO | WO-2022113587 A1 * | 6/2022 | A61B 6/032 |

OTHER PUBLICATIONS

"Written Opinion of the International Searching Authority (Form PCT/ISA/237) of PCT/JP2021/023423", mailed on Aug. 10, 2021, with English translation thereof, pp. 1-6.

Office Action of Japan Counterpart Application, with English translation thereof, issued on Mar. 26, 2024, pp. 1-5.

* cited by examiner

FIG. 5

| | | |
|---|---|---|
| BOUNDARY | - | 50 |
| SHAPE | IRREGULAR | |
| SERRATED SHAPE | - | |
| SPICULA | - | |
| LOBULE | + | |
| STRAIGHT LINE | - | |
| ABSORPTION VALUE | SOLID TYPE | |
| AIR BRONCHOGRAM | - | |
| CAVITY | - | |
| CALCIFICATION | - | |
| FAT | - | |
| PLEURAL INVAGINATION | - | |
| PLEURAL CONTACT | - | |

| COMMENT-ON-FINDINGS INPUT |
|---|
| |

IMAGE DISPLAY APPARATUS, METHOD, AND PROGRAM

CROSS-REFERENCE TO RELATED APPLICATIONS

The present application is a Continuation of PCT International Application No. PCT/JP2021/023423, filed on Jun. 21, 2021, which claims priority to Japanese Patent Application No. 2020-162676, filed on Sep. 28, 2020. Each application above is hereby expressly incorporated by reference, in its entirety, into the present application.

BACKGROUND

Technical Field

The present disclosure relates to an image display apparatus, method, and program.

Related Art

In recent years, advances in medical devices, such as computed tomography (CT) apparatuses and magnetic resonance imaging (MRI) apparatuses, have enabled image diagnosis using high-resolution medical images with higher quality. In particular, since a region of a lesion can be accurately specified by image diagnosis using CT images, MRI images, and the like, appropriate treatment is being performed based on the specified result.

In addition, image diagnosis is made by analyzing a medical image via computer-aided diagnosis (CAD) using a learning model in which machine learning is performed by deep learning or the like, and detecting diseased regions such as a lesion included in the medical image as regions of interest from the medical image. In this way, the analysis result generated by the analysis process via CAD is saved in a database in association with examination information, such as a patient name, gender, age, and a modality which has acquired a medical image, and provided for diagnosis. A doctor interprets a medical image by referring to a distributed medical image and analysis result in his or her own interpretation terminal. At this time, in the interpretation terminal, an annotation is superimposed and displayed on the region of interest including the disease included in the medical image based on the analysis result. For example, figures such as a rectangle surrounding the region of interest and an arrow indicating the region of interest, and text such as the type and size of the disease are superimposed and displayed as annotations. A radiologist refers to the annotations added to the region of interest to create an interpretation report.

However, since annotations are often superimposed on the region of a human body included in the medical image, the annotations may interfere with the interpretation in some cases. Therefore, there has been proposed a method of switching between display and hiding of an annotation by operating a predetermined key (see JP2007-079960A).

However, in the method described in JP2007-079960A, it is necessary for a radiologist to positively perform an operation of displaying or hiding the annotation. Since the radiologist interprets a large number of medical images every day, even a slight operation becomes very troublesome for the radiologist.

SUMMARY OF THE INVENTION

The present disclosure has been made in view of the above circumstances, and an object of the present disclosure is to enable switching between display and hiding of an annotation without performing a troublesome operation.

According to an aspect of the present disclosure, there is provided an image display apparatus comprising at least one processor, in which the processor is configured to: superimpose and display relevant information related to a medical image on the medical image so as to be switchable between display and hiding; and switch at least a part of the relevant information to be hidden in a case where another operation related to display or interpretation of the medical image is detected, the other operation being an operation other than a dedicated operation for switching between display and hiding of the relevant information while the relevant information is being displayed.

In the image display apparatus according to the aspect of the present disclosure, the medical image may be a three-dimensional image including a plurality of tomographic images, and the other operation may be a paging operation on the tomographic image.

In addition, in the image display apparatus according to the aspect of the present disclosure, the other operation may be an operation of inputting a comment on findings related to the medical image.

In addition, in the image display apparatus according to the aspect of the present disclosure, the other operation may be an operation of adding tag information representing a property of a region of interest included in the medical image to the medical image.

In addition, in the image display apparatus according to the aspect of the present disclosure, the other operation may be an operation of changing a size of the medical image.

In addition, in the image display apparatus according to the aspect of the present disclosure, the processor may be configured to switch only the relevant information superimposed on a region of a human body included in the medical image by the other operation to be hidden.

In addition, in the image display apparatus according to the aspect of the present disclosure, the processor may be configured to switch to display the relevant information in a case where the other operation is ended.

In addition, in the image display apparatus according to the aspect of the present disclosure, the relevant information may be an annotation related to a region of interest included in the medical image.

According to an aspect of the present disclosure, there is provided an image display method comprising: superimposing and displaying relevant information related to a medical image on the medical image so as to be switchable between display and hiding; and switching at least a part of the relevant information to be hidden in a case where another operation related to display or interpretation of the medical image is detected, the other operation being an operation other than a dedicated operation for switching between display and hiding of the relevant information while the relevant information is being displayed.

In addition, a program for causing a computer to execute the image display method according to the aspect of the present disclosure may be provided.

According to the aspects of the present disclosure, it is possible to switch between display and hiding of an annotation without performing a troublesome operation.

BRIEF DESCRIPTION OF THE DRAWINGS

FIG. 5 is a diagram showing a property input window.

FIG. 6 is a diagram showing a comment-on-findings input window.

DETAILED DESCRIPTION

Figure 1:
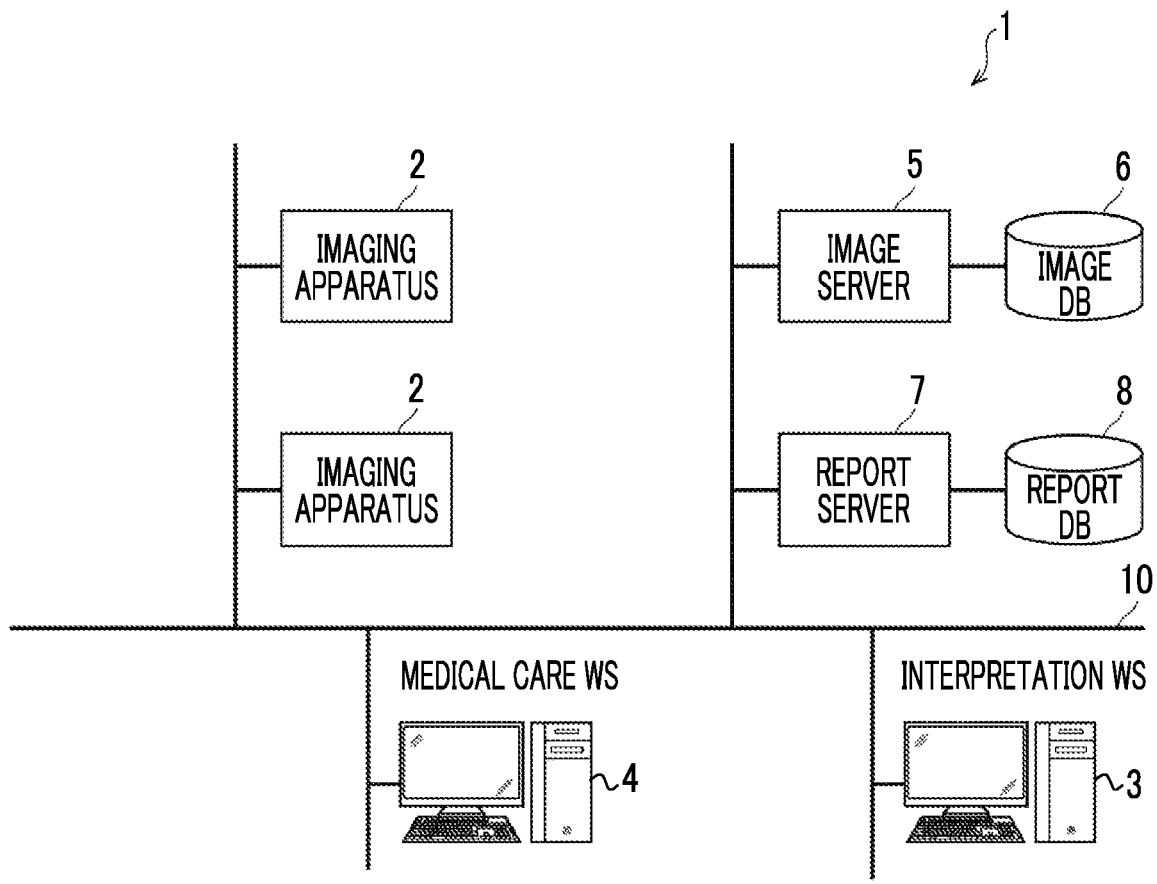
FIG. 1 is a diagram showing a schematic configuration of a medical information system to which an image display apparatus according to an embodiment of the present disclosure is applied.

Hereinafter, embodiments of the present disclosure will be described with reference to the drawings. First, a configuration of a medical information system 1 to which an image display apparatus according to the present embodiment is applied will be described. FIG. 1 is a diagram showing a schematic configuration of the medical information system 1. The medical information system 1 shown in FIG. 1 is, based on an examination order from a doctor in a medical department using a known ordering system, a system for imaging an examination target part of a subject, storing a medical image acquired by the imaging, interpreting the medical image by a radiologist and creating an interpretation report, and viewing the interpretation report and observing the medical image to be interpreted in detail by the doctor in the medical department that is a request source.

As shown in FIG. 1, in the medical information system 1, a plurality of imaging apparatuses 2, a plurality of interpretation workstations (WSs) 3 that are interpretation terminals, a medical care WS 4, an image server 5, an image database (hereinafter referred to as an image DB) 6, a report server 7, and a report database (hereinafter referred to as a report DB) 8 are communicably connected to each other through a wired or wireless network 10.

Each apparatus is a computer on which an application program for causing each apparatus to function as a component of the medical information system 1 is installed. The application program is stored in a storage apparatus of a server computer connected to the network 10 or in a network storage in a state in which it can be accessed from the outside, and is downloaded to and installed on the computer in response to a request. Alternatively, the application program is recorded on a recording medium, such as a digital versatile disc (DVD) and a compact disc read only memory (CD-ROM), and distributed, and is installed on the computer from the recording medium.

The imaging apparatus 2 is an apparatus (modality) that generates a medical image showing a diagnosis target part of the subject by imaging the diagnosis target part. Specifically, examples of the modality include a simple X-ray imaging apparatus, a CT apparatus, an MRI apparatus, a positron emission tomography (PET) apparatus, and the like. The medical image generated by the imaging apparatus 2 is transmitted to the image server 5 and is saved in the image DB 6.

The interpretation WS 3 is a computer used by, for example, a radiologist of a radiology department to interpret a medical image and to create an interpretation report, and encompasses an image display apparatus according to the present embodiment. In the interpretation WS 3, a viewing request for a medical image to the image server 5, various image processing for the medical image received from the image server 5, display of the medical image, input reception of comments on findings regarding the medical image, and the like are performed. In the interpretation WS 3, creation of an interpretation report, a registration request and a viewing request for the interpretation report to the report server 7, display of the interpretation report received from the report server 7, and the like are performed. The above processes are performed by the interpretation WS 3 executing software programs for respective processes.

The medical care WS 4 is a computer used by a doctor in a medical department to observe an image in detail, view an interpretation report, create an electronic medical record, and the like, and is configured to include a processing apparatus, a display apparatus such as a display, and an input apparatus such as a keyboard and a mouse. In the medical care WS 4, a viewing request for the image to the image server 5, display of the image received from the image server 5, a viewing request for the interpretation report to the report server 7, and display of the interpretation report received from the report server 7 are performed. The above processes are performed by the medical care WS 4 executing software programs for respective processes.

The image server 5 is a general-purpose computer on which a software program that provides a function of a database management system (DBMS) is installed. The image server 5 comprises a storage in which the image DB 6 is configured. This storage may be a hard disk apparatus connected to the image server 5 by a data bus, or may be a disk apparatus connected to a storage area network (SAN) or a network attached storage (NAS) connected to the network 10. In a case where the image server 5 receives a request to register a medical image from the imaging apparatus 2, the image server 5 prepares the medical image in a format for a database and registers the medical image in the image DB 6.

Image data of the medical image acquired by the imaging apparatus 2 and accessory information are registered in the image DB 6. The accessory information includes, for example, an image identification (ID) for identifying each medical image, a patient ID for identifying a subject, an examination ID for identifying an examination, a unique ID (unique identification (UID)) allocated for each medical image, examination date and examination time at which a medical image is generated, the type of imaging apparatus used in an examination for acquiring a medical image, patient information such as the name, age, and gender of a patient, an examination part (an imaging part), imaging information (an imaging protocol, an imaging sequence, an imaging method, imaging conditions, and the use of a contrast medium), and information such as a series number or a collection number in a case where a plurality of medical images are acquired in one examination.

In addition, in a case where the viewing request from the interpretation WS 3 and the medical care WS 4 is received through the network 10, the image server 5 searches for a medical image registered in the image DB 6 and transmits the searched for medical image to the interpretation WS 3 and to the medical care WS 4 that are request sources.

The report server 7 incorporates a software program for providing a function of a database management system to a general-purpose computer. In a case where the report server 7 receives a request to register the interpretation report from the interpretation WS 3, the report server 7 prepares the interpretation report in a format for a database and registers the interpretation report in the report DB 8.

In the report DB 8, an interpretation report created by the radiologist using the interpretation WS 3 is registered. The interpretation report may include, for example, a medical image to be interpreted, an image ID for identifying the medical image, a radiologist ID for identifying the radiologist who performed the interpretation, a disease name, disease position information, information for accessing a medical image, and the like.

Further, in a case where the report server 7 receives the viewing request for the interpretation report from the interpretation WS 3 and the medical care WS 4 through the network 10, the report server 7 searches for the interpretation report registered in the report DB 8, and transmits the searched for interpretation report to the interpretation WS 3 and to the medical care WS 4 that are request sources.

In the present embodiment, the diagnosis target is the thoracoabdominal region of a human body, and the medical image is a three-dimensional CT image consisting of a plurality of tomographic images including the thoracoabdominal region. Then, in the interpretation WS 3, the radiologist interprets the CT image to create an interpretation report including comments on findings about diseases such as lungs and livers included in the thoracoabdominal region. The medical image is not limited to the CT image, and any medical image such as an Mill image and a simple X-ray image acquired by a simple X-ray imaging apparatus can be used.

In the present embodiment, a region of interest included in a medical image is detected by analyzing the medical image in creating the interpretation report. The radiologist interprets the image while referring to the detection result. The detection of the region of interest will be described later.

The network 10 is a wired or wireless local area network that connects various apparatuses in a hospital to each other. In a case where the interpretation WS 3 is installed in another hospital or clinic, the network 10 may be configured to connect local area networks of respective hospitals through the Internet or a dedicated line.

Figure 2:
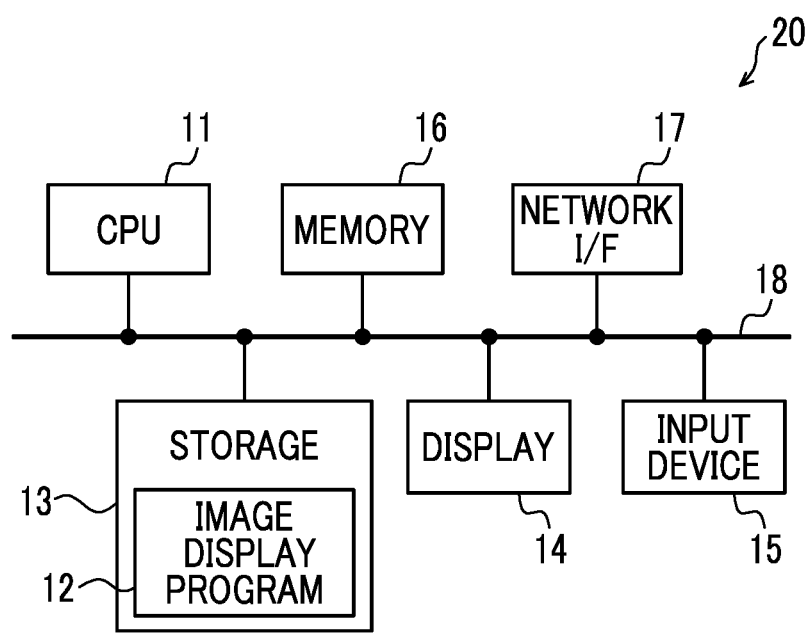
FIG. 2 is a diagram showing a schematic configuration of the image display apparatus according to the present embodiment.

Next, the image display apparatus according to the present embodiment will be described. FIG. 2 illustrates a hardware configuration of the image display apparatus according to the present embodiment. As shown in FIG. 2, an image display apparatus 20 includes a central processing unit (CPU) 11, a non-volatile storage 13, and a memory 16 as a temporary storage area. Further, the image display apparatus 20 includes a display 14 such as a liquid crystal display, an input device 15 consisting of a pointing device such as a keyboard and a mouse, and a network interface (I/F) 17 connected to the network 10. The CPU 11, the storage 13, the display 14, the input device 15, the memory 16, and the network I/F 17 are connected to a bus 18. The CPU 11 is an example of a processor in the present disclosure.

The storage 13 is realized by a hard disk drive (HDD), a solid state drive (SSD), a flash memory, and the like. An image display program 12 is stored in the storage 13 as the storage medium. The CPU 11 reads out the image display program 12 from the storage 13, loads the read-out program into the memory 16, and executes the loaded image display program 12.

Figure 3:
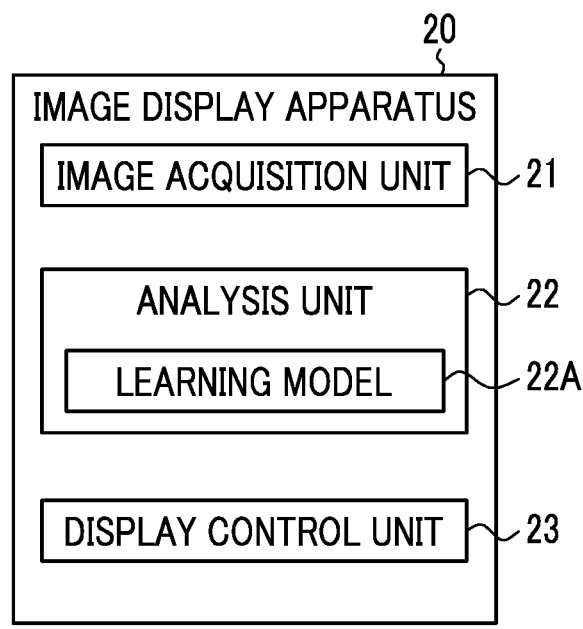
FIG. 3 is a functional configuration diagram of the image display apparatus according to the present embodiment.

Next, a functional configuration of the image display apparatus according to the present embodiment will be described. FIG. 3 is a diagram showing a functional configuration of the image display apparatus according to the present embodiment. As shown in FIG. 3, the image display apparatus 20 comprises an image acquisition unit 21, an analysis unit 22, and a display control unit 23. Then, the CPU 11 executes the image display program 12, so that the CPU 11 functions as the image acquisition unit 21, the analysis unit 22, and the display control unit 23.

The image acquisition unit 21 acquires a medical image to be interpreted for creating an interpretation report from the image server 5 according to an instruction from the input device 15 by the radiologist who is an operator. A medical image to be interpreted is referred to as a target image G0 in the following description. In addition, a plurality of images may be acquired in one examination. Since all the images acquired in one examination are interpreted, there may be a plurality of target images G0. In addition, a plurality of images of a patient to be examined for interpreting the target image G0 may be acquired and saved in the image server 5 in the past. In the present embodiment, in a case of interpreting the target image G0 of the patient to be examined, all the images acquired by imaging the patient to be examined, including the target image G0, are acquired from the image server 5. In the following description, among all images of the patient acquired from the image server 5, images other than the target image G0 are acquired before the target image G0 in a timely manner, and thus are referred to as past images GP0.

In the present embodiment, the target image G0 is a three-dimensional CT image consisting of a plurality of tomographic images acquired by imaging the thoracoabdominal region of the patient to be examined. Further, in a case where a plurality of target images G0 are acquired in one examination, each target image G0 may include an X-ray image acquired by simple X-ray imaging in addition to the CT image. Moreover, the past image GP0 may also include an X-ray image acquired by simple X-ray imaging in addition to the CT image.

The analysis unit 22 detects a region of the abnormal shadow included in the target image G0 as a region of interest, and derives an annotation for the detected region of interest. The analysis unit 22 detects regions of shadows of a plurality of types of diseases as regions of interest from the target image G0 using a known computer-aided diagnosis (that is, CAD) algorithm, and derives annotations by deriving the properties of the regions of interest.

In order to detect the regions of interest and derive the annotations, the analysis unit 22 has a learning model 22A in which machine learning is performed to detect abnormal shadows of a plurality of types of diseases as the regions of interest from the target image G0, and further derive properties.

The learning model 22A consists of a convolutional neural network (CNN) in which deep learning has been performed using supervised training data so as to discriminate whether or not each pixel (voxel) in the target image G0 represents a shadow of various diseases or an abnormal shadow.

The learning model 22A is constructed by training CNN using, for example, a large amount of supervised training data consisting of supervised training images that include abnormal shadows, a region of the abnormal shadows in the supervised training image, and correct answer data representing the properties of the abnormal shadows, and a large amount of supervised training data consisting of supervised training images that do not include abnormal shadows. The learning model 22A derives the confidence degree (likelihood) indicating that each pixel in the medical image is an abnormal shadow, and detects a region consisting of pixels whose confidence degree is equal to or higher than a predetermined threshold value as a region of interest. Here, the confidence degree is a value of 0 or more and 1 or less. Further, the learning model 22A derives the properties of the detected region of interest. The properties include the position and the size of the region of interest, the type of disease, and the like. For example, in a case where the analysis target is a lung, the type of the disease includes a nodule, mesothelioma, a calcification, a pleural effusion, a tumor, a cyst, and the like.

The learning model 22A may detect a region of interest from a three-dimensional target image G0, or may detect a region of interest from each of a plurality of tomographic images constituting the target image G0. Further, as the learning model 22A, any learning model such as, for example, a support vector machine (SVM) can be used in addition to the convolutional neural network.

The analysis unit 22 derives, as annotations, a figure surrounding the region of interest detected by the learning model, text representing the property, a line connecting the figure and the text, and the like. The annotation is derived as an image of a channel different from that of the target image G0. Therefore, in a case where the image of the channel of the annotation is superimposed and displayed on the target image G0, the annotation is superimposed and displayed on the target image G0.

Figure 4:
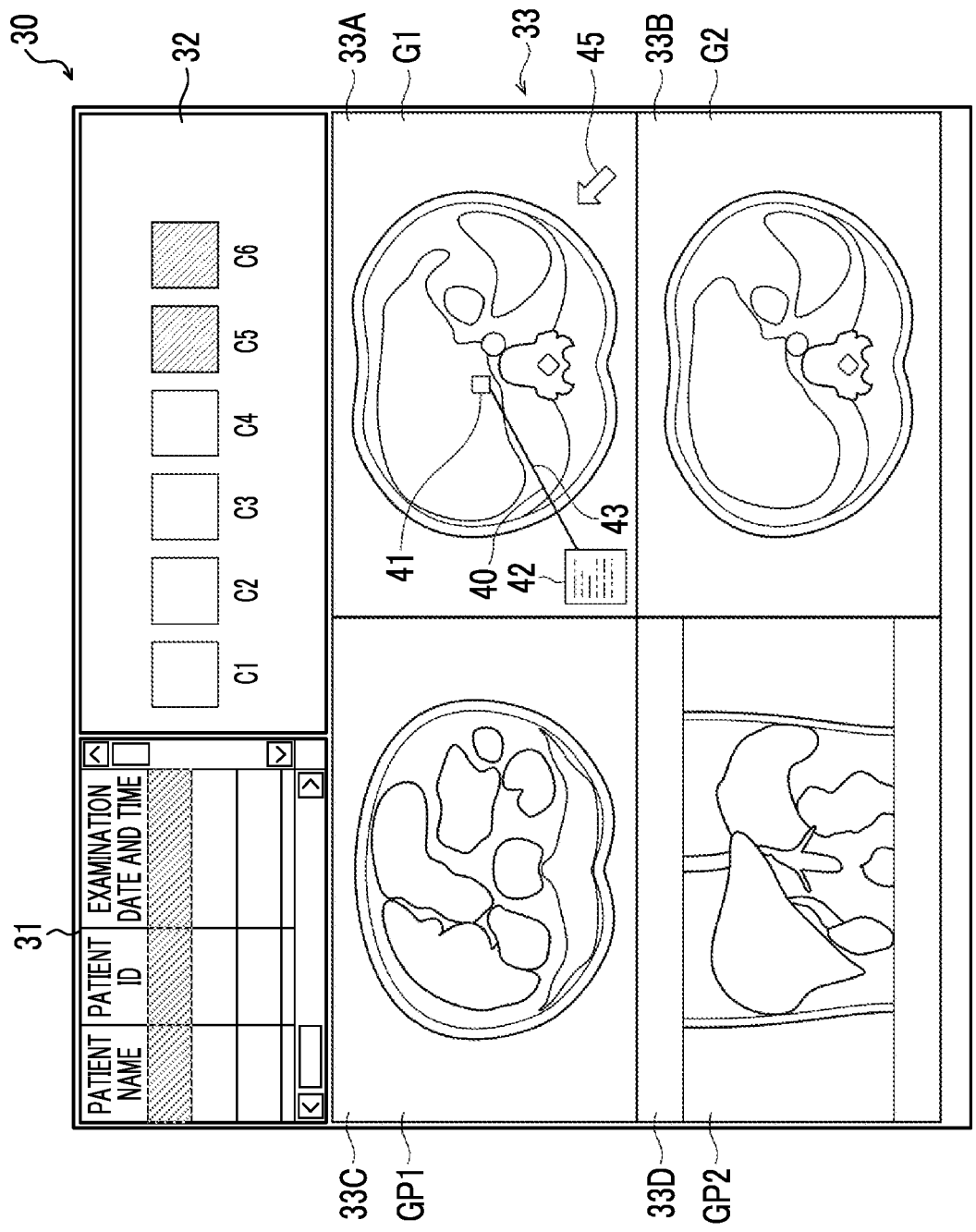
FIG. 4 is a diagram showing a display screen.

The display control unit 23 displays an image of the patient to be examined including the target image G0 and the past image GP0 on the display 14. FIG. 4 is a diagram showing a display screen of an image. As shown in FIG. 4, a display screen 30 includes an examination list area 31 for displaying an examination list, a thumbnail image area 32 for displaying thumbnail images of the target image G0 included in the selected examination and past images of the patient to be examined, and an image display area 33 for displaying an image.

In the examination list area 31, a patient name, a patient ID, and an examination date and time are displayed for each examination. The operator can select the patient to be examined by clicking on a desired examination list. It should be noted that, in FIG. 4, diagonal lines are added to the rows of the patient to be examined selected in the examination list area 31.

In the thumbnail image area 32, thumbnail images of the target images G0 of the selected patient to be examined and representative images of the past images GP0 are displayed. Here, assuming that two target images G1 and G2 and four past images GP1 to GP4 are acquired for the patient to be examined, as shown in FIG. 4, six thumbnail images C1 to C6 are displayed in the thumbnail image area 32. In a case where the image is a three-dimensional image, a minified image of a tomographic image of a predetermined tomographic plane included in the three-dimensional image can be used as a representative image. In the case of a simple X-ray image, the minified image can be used as a representative image. In addition, in the present embodiment, it is assumed that the thumbnail images C1 and C2 are the thumbnail images of the target images G1 and G2, and the thumbnail images C3 to C6 are the thumbnail images of the past images GP1 to GP4.

The image selected in the thumbnail image area 32 is displayed in the image display area 33. As shown in FIG. 4, the image display area 33 includes four display areas 33A to 33D. In FIG. 4, representative images of the four images selected from the six thumbnail images C1 to C6 are displayed in the display areas 33A to 33D of the image display area 33, respectively. In addition, in the thumbnail image area 32, diagonal lines are added to the thumbnail images other than the images displayed in the image display area 33 in order to clearly indicate that the thumbnail images are not displayed in the image display area 33. In the present embodiment, since the thumbnail images C1 and C2 correspond to the target images G1 and G2, respectively, the target images G1 and G2 are displayed in the display areas 33A and 33B, respectively. It is also assumed that the past images GP1 and GP2 are displayed in the display areas 33C and 33D.

Further, as shown in FIG. 4, the display control unit 23 superimposes and displays an annotation 40 related to the region of interest derived by the analysis unit 22 on the target image G1 displayed in the display area 33A. The annotation 40 that is superimposed and displayed is an example of relevant information. The annotation 40 consists of a FIG. 41 surrounding a region of interest included in the tomographic image of the target image G1 displayed in the display area 33A, a text 42 that represents the properties of the region of interest surrounded by the FIG. 41, and a leader line 43 connecting the FIG. 41 and the text 42. The text 42 related to the region of interest surrounded by the FIG. 41 is, for example, the position, the size, the property, or the like of the region of interest.

In the present embodiment, the radiologist interprets the target image G1 displayed on the display screen 30 to confirm the region of interest detected by the analysis unit 22, or newly specify an abnormal shadow that the analysis unit 22 could not detect. At this time, the radiologist can perform a paging operation of switching the tomographic plane of the target image G1 displayed in the display area 33A by moving a mouse pointer 45 to the display area 33A and rotating the mouse wheel. Further, the radiologist can perform an operation of changing the size of the displayed target image G1 by performing a predetermined size change operation using the input device 15. A paging operation and a size change operation are examples of other operations related to the display of the medical image.

In addition, as necessary, the radiologist can perform an operation of adding tag information indicating the property of the newly found abnormal shadow to the target image, or an operation of inputting a comment on findings about the target image G1. The operation of adding the tag information and the operation of inputting the comment on findings are examples of other operations related to the interpretation of the medical image.

The operation of adding the tag information indicating the property to the target image is an operation of displaying a property input window 50 shown in FIG. 5 in a pop-up manner by, for example, specifying a newly found abnormal shadow with the mouse pointer 45 and right-clicking the specified abnormal shadow. In the property input window 50, for example, items of a boundary, a shape, a marginal property, a serrated shape, a spicula, a lobule, a straight line, an absorption value, an air bronchogram, a cavity, a calcification, a fat, a pleural invagination, and a pleural contact are shown as the properties of the abnormal shadow of the lung. Negative (−) or positive (+) can be selected for the items of the boundary, marginal property, serrated shape, spicula, lobule, straight line, air bronchogram, cavity, calcification, fat, pleural invagination, and pleural contact. As for the shape item, irregular and well shape items can be selected. For the absorption value, a solid type or a frosted glass type can be selected. In addition, the operation of inputting the comment on findings is an operation of displaying a comment-on-findings input window 51 shown in FIG. 6 in a pop-up manner by right-clicking the mouse on the displayed target image.

Figure 7:
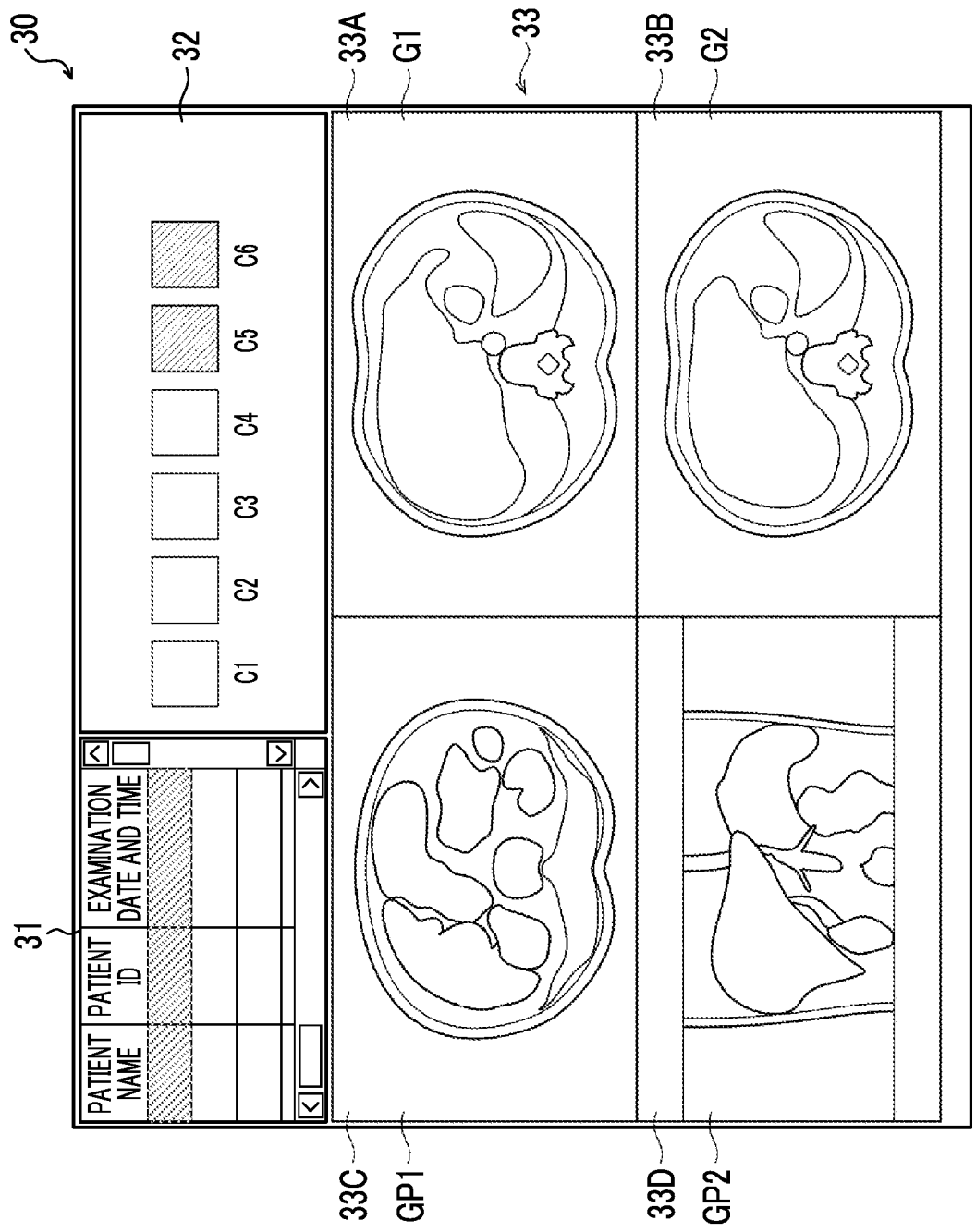
FIG. 7 is a diagram showing a state in which an annotation is switched to be hidden.

In the present embodiment, upon detecting an operation related to the display of the image and an operation related to the interpretation of the image, the display control unit 23 switches the annotation 40 superimposed and displayed on the target image G1 to be hidden. For example, upon detecting a paging operation or a size change operation (hereinafter referred to as a paging operation or the like) for the target image G1 displayed in the display area 33A, the display control unit 23 switches the annotations 40 superimposed and displayed on each tomographic image to be hidden. Thereby, as shown in FIG. 7, the annotation 40 is not superimposed and displayed on the target image G1 while the paging operation or the like is being performed. On the other hand, in a case where the paging operation or the like is ended by stopping the mouse wheel or the like, the display control unit 23 again superimposes and displays the annotation 40 on the target image G0. Note that, at the end of the paging operation, in a case where the region of interest is not detected in the tomographic image displayed when the mouse wheel is stopped, the annotation 40 is not displayed.

Figure 8:
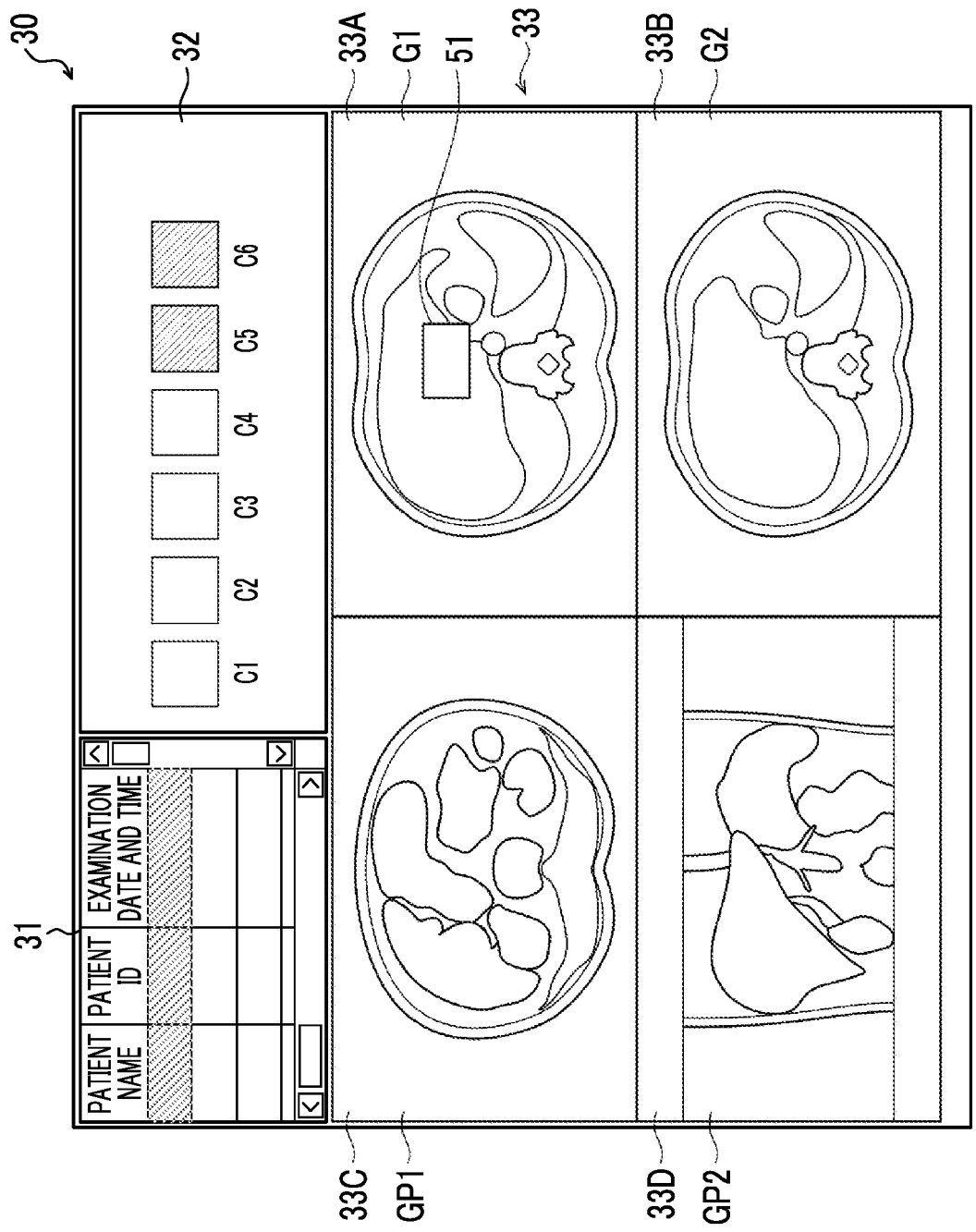
FIG. 8 is a diagram showing a state in which an annotation is switched to be hidden.

In addition, as shown in FIG. 8, upon detecting an operation of right-clicking the mouse on the target image G1 displayed in the display area 33A and displaying the comment-on-findings input window 51 in a pop-up manner, the display control unit 23 switches the annotation 40 superimposed and displayed on each tomographic image to be hidden. Thereby, the annotation 40 is not superimposed and displayed on the target image G1 during the input of the comment on findings to the comment-on-findings input window 51. On the other hand, in a case where the input of the comment on findings is ended and the comment-on-findings input window 51 is switched to be hidden, the display control unit 23 again superimposes and displays the annotation 40 on the target image G0.

In the present embodiment, the display control unit 23 may switch between the display and hiding of the annotation 40 even in a case where the display control unit 23 detects a dedicated operation for switching the display and hiding of the annotation 40. The dedicated operation is, for example, an operation of pressing a specific key on a keyboard.

Figure 9:
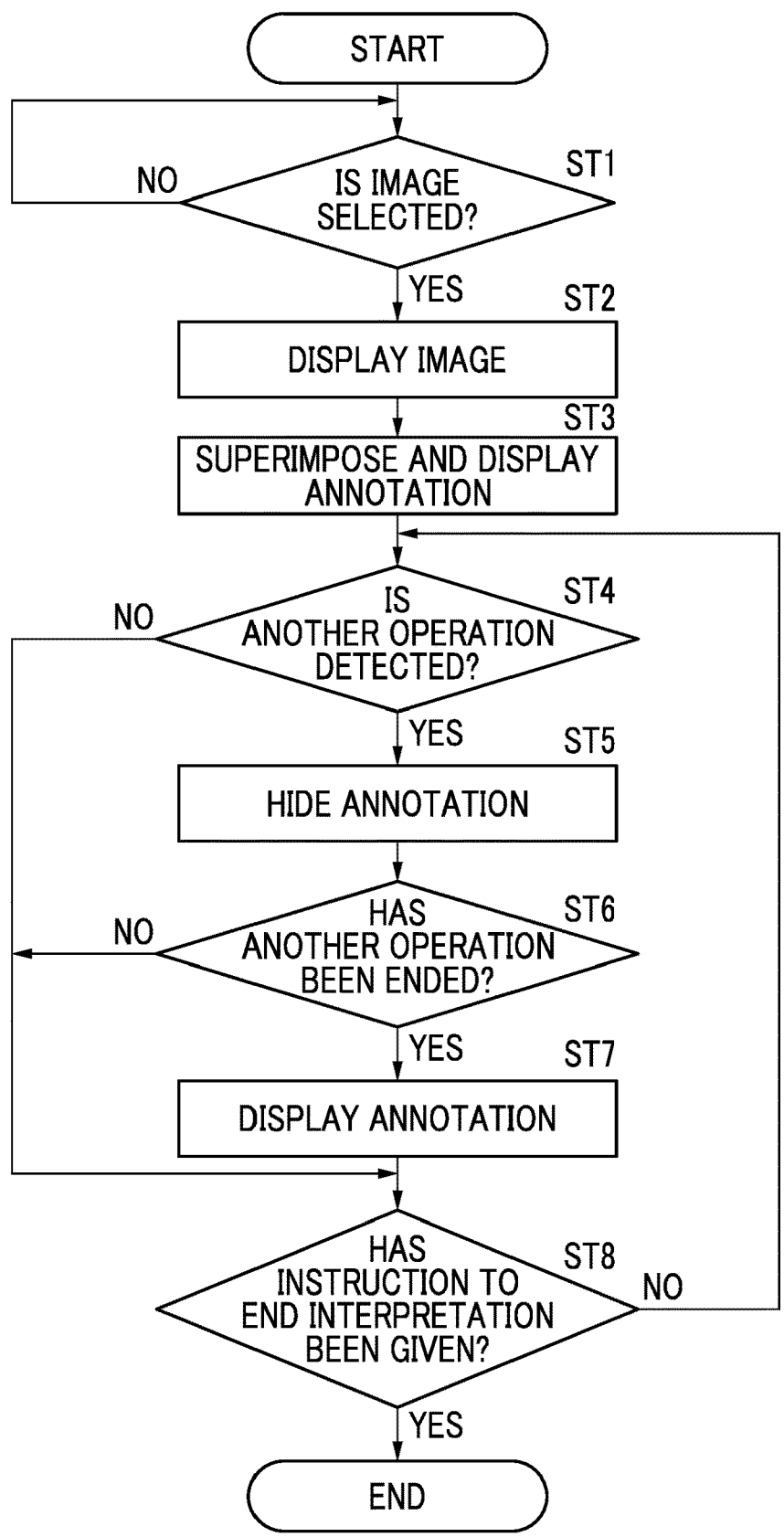
FIG. 9 is a flowchart showing a process performed in the present embodiment.

Next, a process performed in the present embodiment will be described. FIG. 9 is a flowchart showing a process performed in the present embodiment. It is assumed that a plurality of images including the target image G0 and the past image GP0 of the patient to be examined are acquired from the image server 5 and are saved in the storage 13. Further, it is assumed that the display control unit 23 displays the display screen 30 on the display 14, the examination list is selected on the display screen 30, and the image related to the selected examination is displayed in the thumbnail image area 32. In the thumbnail image area 32, in a case where an image to be displayed in the image display area 33 is selected (Step ST1; affirmative), the display control unit 23 displays the selected image in the image display area 33 (Step ST2). At this time, the display control unit 23 superimposes and displays the annotation 40 on the image in which the region of interest is detected (Step ST3).

Next, the display control unit 23 determines whether or not another operation related to the display of the image or another operation related to the interpretation of the image is detected (other operation detection; Step ST4), and in a case where the determination in Step ST4 is affirmative, the annotation 40 is switched to be hidden (Step ST5). Accordingly, the radiologist can perform operations such as performing a paging operation or the like, inputting a comment on findings, or adding a property tag to the newly found abnormal shadow in a state where the annotation 40 is not displayed. The input comment on findings is saved in the storage 13 as an interpretation report. Further, the property tag is added to the target image G0 as tag information.

Subsequently, the display control unit 23 determines whether or not another operation has been ended (Step ST6), and in a case where the determination in Step ST6 is affirmative, the annotation 40 is switched to display (Step ST7). In a case where the determinations in steps ST4 and ST6 are negative, and in a case where, after Step ST7, it is determined whether or not an instruction to end interpretation has been given (Step ST8) and the determination in Step ST8 is negative, the process returns to Step ST4. In a case where the determination in Step ST8 is affirmative, the process ends. The interpretation report generated by the interpretation of the target image G0 and the target image G0 to which the property tag is added are transferred to the report server 7. In the report server 7, the transferred interpretation report is saved together with the target image G0.

In this way, in the present embodiment, in a case where another operation related to the display of the medical image or another operation related to the interpretation of the image is detected, the annotation 40 is switched to be hidden. Therefore, it is possible to prevent the annotation 40 from interfering with these operations in a case where the display of the image is switched to interpret the image or the comment on findings is input. In particular, in the present embodiment, the operator can switch the annotation 40 to be hidden without performing a dedicated operation for switching the annotation 40 to be hidden. Therefore, according to the present embodiment, it is possible to switch between the display and hiding of the annotation without performing a troublesome operation.

Figure 10:
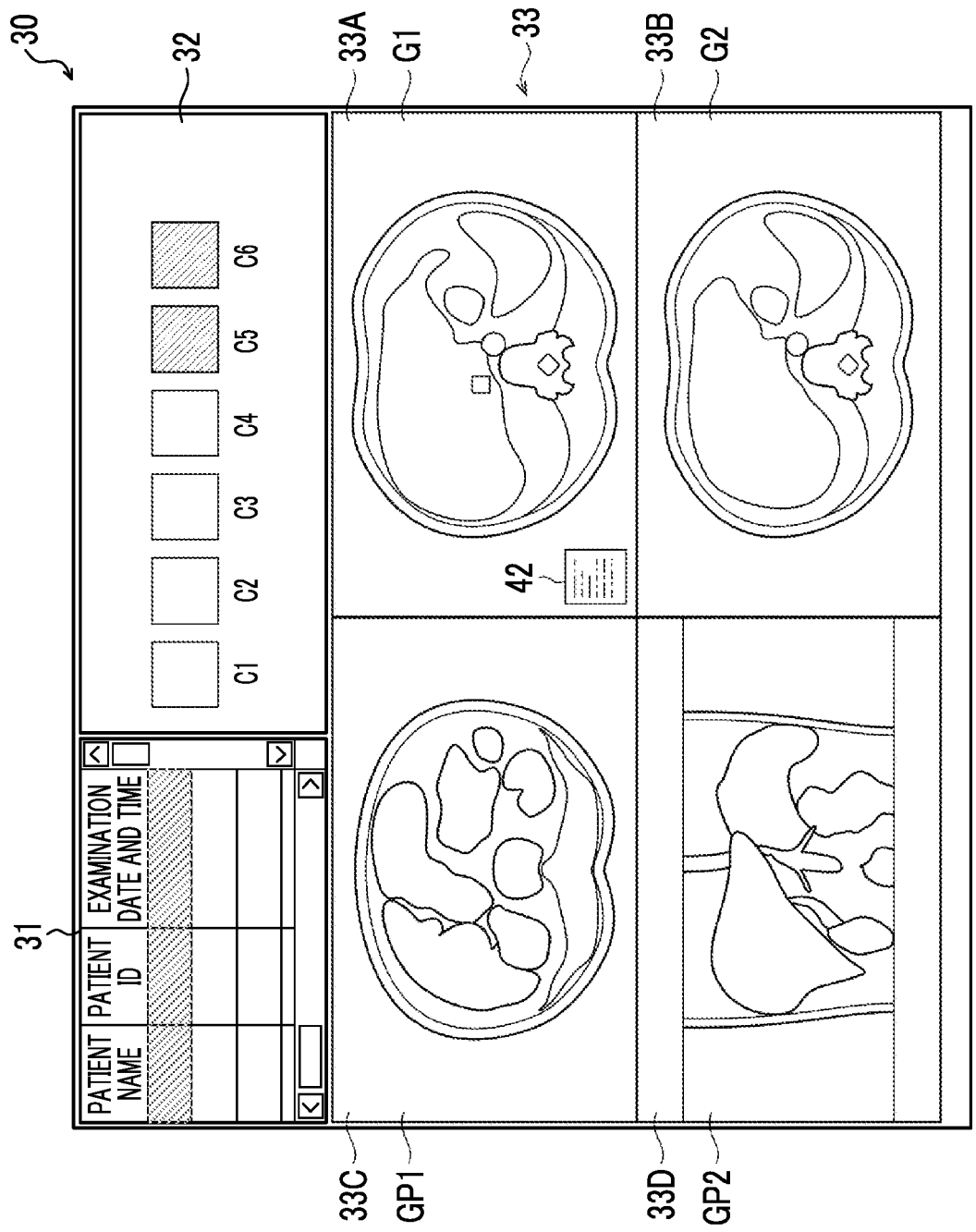
FIG. 10 is a diagram showing a state in which a part of an annotation is switched to be hidden.

In the above-described embodiment, in a case where another operation related to the display of the image or another operation related to the interpretation of the image is detected, all displayed annotations 40 being displayed are configured to be hidden, but the present disclosure is not limited thereto. Only a portion of the annotation 40 that overlaps with the human body included in the target image G0 may be hidden. For example, as shown in FIG. 10, in the annotation 40, only the FIG. 41 and the leader line 43 superimposed on the region of the human body included in the target image G1 may be hidden, and the superimposed display of the text 42 outside the region of the human body may be continued.

Further, in the above-described embodiment, in the image on which the annotation 40 is superimposed and displayed, an abnormal shadow different from the abnormal shadow may be found for the region of interest to which the annotation 40 is added. In this case, the radiologist may perform an operation of adding an annotation using the found abnormal shadow as a new region of interest. In such a case, in a case where the operation of adding the annotation to the new region of interest is performed, the annotation 40 previously superimposed and displayed may be switched to be hidden.

Figure 11:
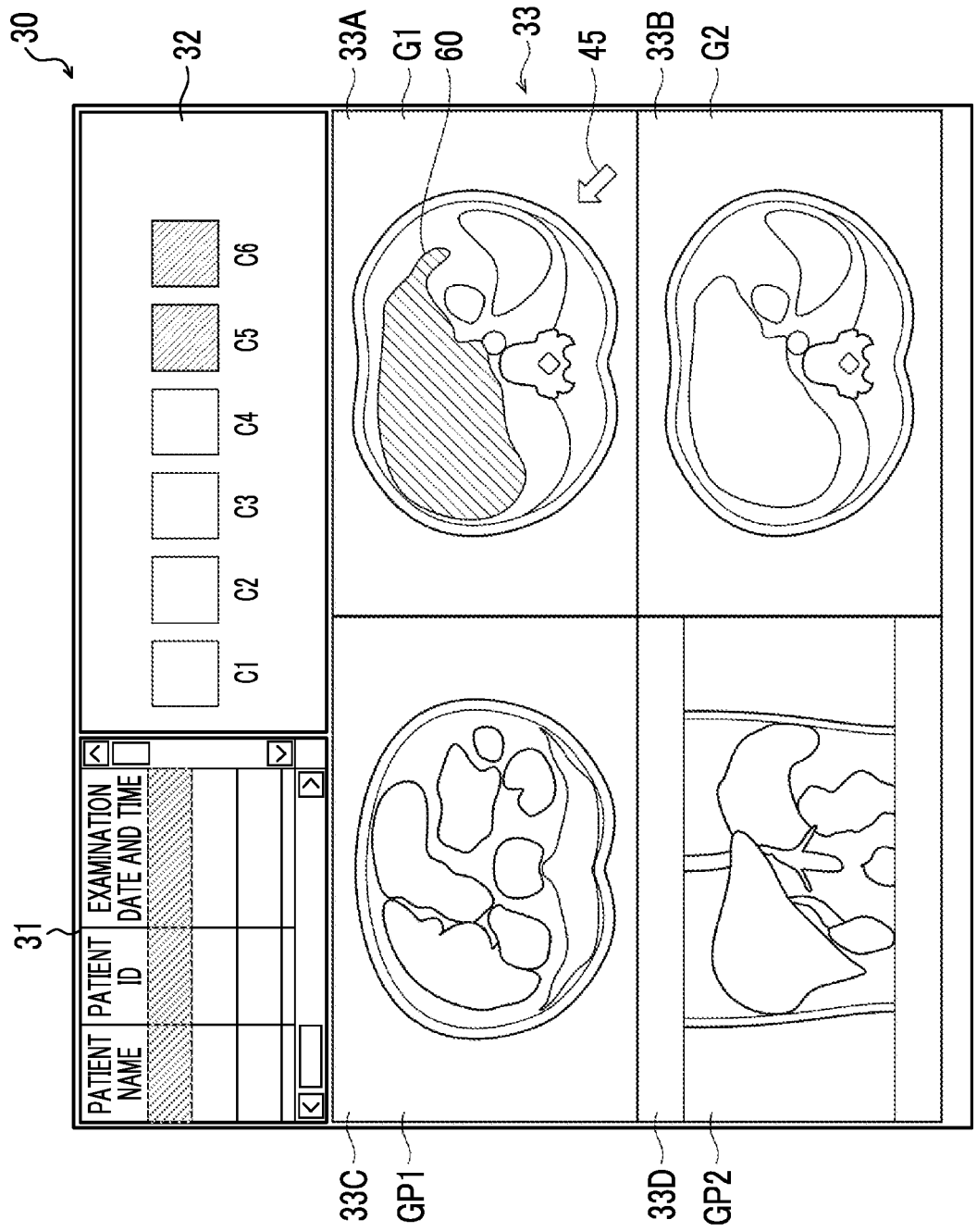
FIG. 11 is a diagram showing a state in which a mask representing a region extraction result as relevant information is superimposed and displayed on an image.

Further, in the above-described embodiment, in a case where the annotation 40 is superimposed and displayed on the target image G1 and another operation related to the display of the target image G1 or another operation related to the interpretation of the image is detected, the annotation 40 is switched to be hidden, but the present disclosure is not limited thereto. In addition to the annotation 40, examples of the relevant information superimposed and displayed on the target image G1 include a region extraction result of a structure included in the target image G1 or the like. For example, as shown in FIG. 11, a mask 60 for a region of the liver included in the target image G1 may be superimposed and displayed on the target image G1 as a region extraction result. In a case where relevant information other than the annotation 40 is superimposed and displayed on the image, the relevant information may be switched to be hidden even in a case where another operation related to display of the image or another operation related to interpretation of the image is detected.

Further, in the above-described embodiment, the annotation 40 is superimposed and displayed only on the target image G0 displayed in the display area 33A, but in a case where the region of interest is detected in the images displayed in the other display areas 33B to 33D, annotations are superimposed and displayed. In this case, in a case where another operation related to the display of the image or another operation related to the interpretation of the image is performed on the image displayed in a certain display area, annotations in display areas other than the display area may be switched to be hidden.

Further, in the above-described embodiment, a plurality of images are displayed on the display screen 30 at the same time, but the present disclosure is not limited thereto. The technology of the present disclosure can also be applied to a case where only one image is displayed on the display screen 30.

Further, in the above-described embodiment, the image display apparatus included in the interpretation WS 3 according to the present embodiment comprises the analysis unit 22 so that the interpretation WS 3 analyzes the target image, but the present disclosure is not limited thereto. The target image may be analyzed by an external analysis device different from the interpretation WS 3, and the analysis result may be acquired by the interpretation WS 3. In addition, an annotation may already be superimposed on the image saved in the image server 5. Even in such a case, as in the above-described embodiment, in a case where the image on which the annotation is superimposed is displayed in the interpretation WS 3 and another operation related to the display of the image or another operation related to the interpretation of the image is detected, the annotation can be switched to be hidden.

In each of the above embodiments, for example, as hardware structures of processing units that execute various kinds of processing, such as the image acquisition unit 21, the analysis unit 22, and the display control unit 23, various processors shown below can be used. As described above, the various processors include a programmable logic device (PLD) as a processor of which the circuit configuration can be changed after manufacture, such as a field programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (programs).

One processing unit may be configured by one of the various processors, or may be configured by a combination of the same or different kinds of two or more processors (for example, a combination of a plurality of FPGAs or a combination of the CPU and the FPGA). In addition, a plurality of processing units may be configured by one processor.

As an example in which a plurality of processing units are configured by one processor, first, there is a form in which one processor is configured by a combination of one or more CPUs and software as typified by a computer, such as a client or a server, and this processor functions as a plurality of processing units. Second, there is a form in which a processor for realizing the function of the entire system including a plurality of processing units via one integrated circuit (IC) chip as typified by a system on chip (SoC) or the like is used. In this way, various processing units are configured by one or more of the above-described various processors as hardware structures.

Furthermore, as the hardware structure of the various processors, more specifically, an electrical circuit (circuitry) in which circuit elements such as semiconductor elements are combined can be used.

What is claimed is:

1. An image display apparatus comprising at least one processor,
wherein the processor is configured to:
superimpose and display relevant information related to a medical image on the medical image so as to be switchable between display and hiding;
switch at least a part of the relevant information to be hidden in a case where another operation related to display or interpretation of the medical image is detected, the other operation being an operation other than a dedicated operation for switching between display and hiding of the relevant information while the relevant information is being displayed,
wherein the medical image is a three-dimensional image including a plurality of tomographic images, and
wherein the other operation comprises a paging operation on the plurality of tomographic images;
in response to detecting the paging operation being performed on the plurality of tomographic images, hide the relevant information from the medical image; and
in response to detecting the paging operation being stopped, superimpose and display the relevant information on the medical image.

2. The image display apparatus according to claim 1, wherein the other operation further comprises an operation of inputting a comment on findings related to the medical image.

3. The image display apparatus according to claim 1, wherein the other operation further comprises an operation of adding tag information representing a property of a region of interest included in the medical image to the medical image.

4. The image display apparatus according to claim 1, wherein the other operation further comprises an operation of changing a size of the medical image.

5. The image display apparatus according to claim 1, wherein the processor is configured to switch only the relevant information superimposed on a region of a human body included in the medical image to be hidden.

6. The image display apparatus according to claim 1, wherein the processor is configured to switch to display the relevant information in a case where the other operation is ended.

7. The image display apparatus according to claim 1,
wherein the relevant information is an annotation related to a region of interest included in the medical image.

8. An image display method comprising:
superimposing and displaying relevant information related to a medical image on the medical image so as to be switchable between display and hiding;
switching at least a part of the relevant information to be hidden in a case where another operation related to display or interpretation of the medical image is detected, the other operation being an operation other than a dedicated operation for switching between display and hiding of the relevant information while the relevant information is being displayed,
  wherein the medical image is a three-dimensional image including a plurality of tomographic images, and
  wherein the other operation comprises a paging operation on the plurality of tomographic images;
in response to detecting the paging operation being performed on the plurality of tomographic images, hiding the relevant information from the medical image; and
in response to detecting the paging operation being stopped, superimposing and displaying the relevant information on the medical image.

9. A non-transitory computer-readable storage medium that stores an image display program causing a computer to execute:

a procedure of superimposing and displaying relevant information related to a medical image on the medical image so as to be switchable between display and hiding; and a procedure of switching at least a part of the relevant information to be hidden in a case where another operation related to display or interpretation of the medical image is detected, the other operation being an operation other than a dedicated operation for switching between display and hiding of the relevant information while the relevant information is being displayed,
  wherein the medical image is a three-dimensional image including a plurality of tomographic images, and
  wherein the other operation comprises a paging operation on the plurality of tomographic images;

a procedure of, in response to detecting the paging operation being performed on the plurality of tomographic images, hiding the relevant information from the medical image; and a procedure of, in response to detecting the paging operation being stopped, superimposing and displaying the relevant information on the medical image.

* * * * *